United States Patent
Politopoulos et al.

(10) Patent No.: US 11,944,097 B2
(45) Date of Patent: Apr. 2, 2024

(54) ANTIMICROBIAL COMPOSITION

(71) Applicant: Aseptic Health, LLC, Nashville, TN (US)

(72) Inventors: Michael Politopoulos, Chattanooga, TN (US); Autumn N. Ryan, Nashville, TN (US); Gustave J. Scannapieco, Nolensville, TN (US)

(73) Assignee: Aseptic Health, LLC, Nashville, TN (US)

( * ) Notice: Subject to any disclaimer, the term of this patent is extended or adjusted under 35 U.S.C. 154(b) by 0 days.

(21) Appl. No.: 16/894,618

(22) Filed: Jun. 5, 2020

(65) Prior Publication Data
US 2021/0000107 A1 Jan. 7, 2021

Related U.S. Application Data

(60) Provisional application No. 63/009,863, filed on Apr. 14, 2020, provisional application No. 62/925,997, filed on Oct. 25, 2019, provisional application No. 62/869,112, filed on Jul. 1, 2019.

(51) Int. Cl.
*A01N 33/12* (2006.01)
*A01N 25/02* (2006.01)
*A01N 59/00* (2006.01)

(52) U.S. Cl.
CPC .......... *A01N 33/12* (2013.01); *A01N 25/02* (2013.01); *A01N 59/00* (2013.01)

(58) Field of Classification Search
None
See application file for complete search history.

(56) References Cited

U.S. PATENT DOCUMENTS

| | | |
|---|---|---|
| 3,278,447 A | 10/1966 | McNicholas |
| 3,297,578 A | 1/1967 | Crutchfield et al. |
| 3,585,147 A | 6/1971 | Gordon |
| 4,073,888 A | 2/1978 | Snyder |
| 4,104,190 A | 8/1978 | Hartshorn |
| 5,076,960 A | 12/1991 | Hutchings et al. |
| 5,078,908 A | 1/1992 | Ripley et al. |
| 5,281,392 A | 1/1994 | Rubinstein |
| 5,306,440 A | 4/1994 | Ripley et al. |
| 5,736,165 A | 4/1998 | Ripley et al. |
| 6,395,698 B1 | 5/2002 | Daun et al. |
| 7,148,187 B1* | 12/2006 | Simon ............. C11D 1/83 510/438 |
| 7,875,460 B2 | 1/2011 | Ratcliff et al. |
| 8,673,297 B2 | 3/2014 | Speronello et al. |
| 8,703,106 B2 | 4/2014 | Speronello et al. |
| 9,480,645 B2 | 11/2016 | Yu |
| 10,251,971 B2 | 4/2019 | Roy et al. |
| 2005/0196370 A1 | 9/2005 | Yu et al. |
| 2010/0055196 A1* | 3/2010 | MacGregor ........ A61L 2/18 424/600 |
| 2012/0111743 A1* | 5/2012 | Kramer ............ C11D 3/3956 424/44 |
| 2012/0322124 A1 | 12/2012 | Okull et al. |
| 2013/0025634 A1* | 1/2013 | Milanese ............ A61L 2/07 134/30 |
| 2014/0369953 A1 | 12/2014 | Purschwitz et al. |
| 2015/0306266 A1 | 10/2015 | Burke et al. |
| 2017/0065738 A1 | 3/2017 | Roy et al. |
| 2017/0215415 A1 | 8/2017 | Reay |
| 2017/0224882 A1 | 8/2017 | Clevenger et al. |
| 2018/0318339 A1 | 11/2018 | Pamel |

FOREIGN PATENT DOCUMENTS

| | | | |
|---|---|---|---|
| CN | 108350395 A | 7/2018 | |
| KR | 20090096306 | 9/2009 | |
| WO | WO-9709267 A1 * | 3/1997 | ........... A01N 59/00 |
| WO | WO-9937172 A1 * | 7/1999 | ........... A23B 4/10 |
| WO | WO-03082304 A1 * | 10/2003 | ........... A61K 33/14 |
| WO | WO-2004101432 A2 * | 11/2004 | ........... A01N 59/00 |
| WO | WO 2006/000756 A1 | 1/2006 | |
| WO | 2007103968 A1 | 9/2007 | |
| WO | WO 2012/096766 A1 | 7/2012 | |
| WO | WO 2015/200488 A1 | 12/2015 | |
| WO | WO-2017041038 A1 * | 3/2017 | ........... A01N 33/12 |

OTHER PUBLICATIONS

CAPlus abstract of CN 101766186, original document published 2010 (Year: 2010).*
Machine translation of CN 101766186, original document published 2010 (Year: 2010).*
Hawley's Condensed Chemical Dictionary, Sixteenth Edition, Author(s): Michael D. Larrañaga, Richard J. Lewis Sr., Robert A. Lewis, p. 18, 212 and 213; First published:Aug. 25, 2016 (Year: 2016).*
Quantitative Chemical Analysis, 4th Edition, Harris editor, p. 229-231, 1995 (Year: 1995).*
Table of pKa values, accessed Dec. 20, 2022 (Year: 2022).*
Xiao Z, Luo Y, Luo Y, Wang Q. Combined effects of sodium chlorite dip treatment and chitosan coatings on the quality of fresh-cut d'Anjou pears. Postharvest Biology and Technology. Dec. 1, 2011;62(3):319-26. (Year: 2011).*
Abstract of CN1947516A—Disinfectant Composition With Function of Deodorization and Bleaching Effects and its Prepn Method; one page.
Abstract of CN101703071B—Disinfectant Composition Containing Molecular-State Chlorine Dioxide and Applications Thereof; one page.

(Continued)

*Primary Examiner* — Nissa M Westerberg
(74) *Attorney, Agent, or Firm* — Bradley Arant Boult Cummings, LLP; Blake M. Bernard

(57) ABSTRACT

The present disclosure generally describes an antimicrobial composition comprising: a water solution comprising a chlorite salt and/or chlorine dioxide having a concentration ranging from about 2,000 parts per million to about 8,000 parts per million, and at least one quaternary ammonium salt having a concentration ranging from about 5,000 parts per million to about 10,000 parts per million. The present compositions are advantageously effective against a variety of bacteria, viruses, molds, and fungi, and may be used in a variety applications. Such applications include, without limitation, healthcare setting and equipment disinfection, food surface disinfection, agricultural disinfection, and personal hand care disinfection.

24 Claims, 5 Drawing Sheets

(56) References Cited

OTHER PUBLICATIONS

Abstract of CN101766186A—Composition Capable of Slowly-Releasing Chlorine Dioxide and Application thereof; one page.
Abstract of CN101766543B—Hand Sanitizer Containing Chlorine Dioxide; one page.
VitalSolutions, LLC, Material Safety Data Sheet, Vital Oxide, dated Apr. 16, 2013, 4 pages.
VitalSolutions, LLC—Vital Oxide—Residential, Commercial & Hospital Disinfectant, two pages.
PCT/US2020/040577, International Search Report and Written Opinion, dated Oct. 23, 2020, 12 pages.
Office Action for CA Application No. 3,145,760 dated Oct. 24, 2023, in 5 pages.
Office Action for CN Application No. 202080058924.0 dated Mar. 7, 2023, in 22 pages.
Extended European Search Report for EP Application. 20834245.1 dated Jul. 5, 2023, in 10 pages.
Supplemental Search Report for EP Application No. 20834245.1 dated Jul. 25, 2023, in 1 page.
Office Action dated Dec. 12, 2023 in corresponding Indian Patent Application No. 202217005462, in 7 pgs.
Office Action dated Nov. 29, 2023 in corresponding Chinese Patent Application No. 202080058924.0, in 19 pgs.

\* cited by examiner

*FIG. 1*

| Test Microorganism | Test Substance | Carriers | CFU/Carrier | $Log_{10}$ Density | Mean $Log_{10}$ Density |
|---|---|---|---|---|---|
| P. aeruginosa ATCC 15422 | Sanitize-it Solution Lot: LP042519 | Pre Treatment | 7.30E+06 | 6.86 | 6.84 |
| | | Mid Treatment | 6.70E+06 | 6.83 | |
| | | Post Treatment | 6.60E+06 | 6.82 | |

| Test Microorganism | Contact Time | Test Substance | Number of Carriers Tested | Number of Confirmed Positive Subculture/Neutralizer Test Tubes |
|---|---|---|---|---|
| P. aeruginosa ATCC 15422 | 3 minutes | Sanitize-it Solution Lot: LP042519 | 60 | 1 |
| | 5 minutes | | | 0 |
| | 8 minutes | | | 0 |

| Test Microorganism | Contact Time | Test Substance | NV Inoculum counts (CFU) | Average NV Count (CFU) | Neutralization Validation Result |
|---|---|---|---|---|---|
| P. aeruginosa ATCC 15422 | 30 seconds | R-water #575 06/03/2019 | 13/15 | 14 | Neutralization Verified |

| Test Organism: *Escherichia coli* (ATCC 11229) | | | | | |
|---|---|---|---|---|---|
| Test Substance | Survivors (CFU) | | Test Results | Log₁₀ Reduction | Percent Reduction |
| | Volume plated | | | | |
| | 1.00 mL (10⁻¹) | 0.100 mL (10⁻²) | | | |
| RD286 Lot 1 (NaAc), pH 7.00 9-23-2019 | 12, 1, 0, 0 | 0, 0, 0, 0 | 3 x 10¹ CFU/mL (1.48 Log₁₀) | 6.04 | 99.9999% |
| RD286 Lot 2 (NaAc), pH 7.00 9-23-2019 | 0, 0, 0, 0 | 0, 0, 0, 0 | <1 x 10⁰ CFU/mL (<0.00 Log₁₀) | >7.52 | >99.99999% |
| RD286 Lot 3 (NaAc), pH 7.00 9-23-2019 | 1, 0, 0, 0 | 1, 0, 0, 0 | <1 x 10⁰ CFU/mL (<0.00 Log₁₀) | >7.52 | >99.99999% |

| Test Organism: *Staphylococcus aureus* (ATCC 6538) | | | | | |
|---|---|---|---|---|---|
| Test Substance | Survivors (CFU) | | Test Results | Log₁₀ Reduction | Percent Reduction |
| | Volume plated | | | | |
| | 1.00 mL (10⁻¹) | 0.100 mL (10⁻²) | | | |
| RD286 Lot 1 (NaAc), pH 7.00 9-23-2019 | 0, 0, 0, 0 | 0, 0, 0, 0 | <1 x 10⁰ CFU/mL (<0.00 Log₁₀) | >7.40 | >99.99999% |
| RD286 Lot 2 (NaAc), pH 7.00 9-23-2019 | 0, 0, 0, 0 | 0, 0, 0, 0 | <1 x 10⁰ CFU/mL (<0.00 Log₁₀) | >7.40 | >99.99999% |
| RD286 Lot 3 (NaAc), pH 7.00 9-23-2019 | 0, 0, 0, 0 | 0, 0, 0, 0 | <1 x 10⁰ CFU/mL (<0.00 Log₁₀) | >7.40 | >99.99999% |

FIG. 2

| Test Organism: Enterobacter aerogenes (ATCC 13048) | | | | | | |
|---|---|---|---|---|---|---|
| Test Substance | Carrier # | CFU/ Carrier | Log₁₀ | Average Log₁₀ | Geometric Mean | Percent Reduction |
| RD286 Lot 1 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |
| RD286 Lot 2 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |
| RD286 Lot 3 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |

| Test Organism: Staphylococcus aureus (ATCC 6538) | | | | | | |
|---|---|---|---|---|---|---|
| Test Substance | Carrier # | CFU/ Carrier | Log₁₀ | Average Log₁₀ | Geometric Mean | Percent Reduction |
| RD286 Lot 1 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |
| RD286 Lot 2 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |
| RD286 Lot 3 (NaAc), pH 7.00 9-23-2019 | 1 | <2 x 10¹ | <1.30 | <1.30 | <2.00 x 10¹ | >99.999% |
| | 2 | <2 x 10¹ | <1.30 | | | |
| | 3 | <2 x 10¹ | <1.30 | | | |
| | 4 | <2 x 10¹ | <1.30 | | | |
| | 5 | <2 x 10¹ | <1.30 | | | |

FIG. 3

ANTIMICROBIAL COMPOSITION

CROSS-REFERENCES TO RELATED APPLICATIONS

This application claims the benefit of U.S. Provisional Application Nos. 62/869,112 filed on Jul. 1, 2019, 62/925,997 filed on Oct. 25, 2019, and 63/009,863 filed on Apr. 14, 2020, each of which is incorporated by reference in its entirety.

TECHNICAL FIELD

The present disclosure generally relates to antimicrobial compositions and methods of using such antimicrobial compositions for killing harmful bacteria, viruses, funguses, molds, and the like.

BACKGROUND

*Clostridium difficile* ATCC 43598 (*C. difficile*), *Staphylococcus aureus* (*S. aureus*), *Escherichia coli* (*E. coli*), *Pseudomonas Aeruginosa* (*P. aeruginosa*), *Enterobacter aerogenes*, and other harmful bacteria can be found in a variety of environments including, but not limited to, medical, industrial, residential, or food preparation environments. Exposure to these bacteria can cause illness, disease, and/or infection, particularly in medical settings where patients may have open wounds or lowered immune systems. While there are many available products that can kill such organisms efficiently, many of these products are harmful chemicals which can be toxic to humans if ingested and/or irritating/harmful to the touch, which is undesirable.

Additionally, many of the above noted bacteria can be found on agricultural products such as plants, herbs, vegetables, fruits, cannabis, hemp, etc. For instance *E. coli* has been frequently discovered in harmful quantities on lettuce plants. Additionally, powdery mildew is a fungus which can negatively affect various agricultural products. Conventional antimicrobial products cannot be applied to these types of products because they can be harmful to the agricultural product itself. Thus while conventional cleaning compositions may be effective at killing the bacteria and fungi on the agricultural product, conventional compositions can also potentially kill the underlying agricultural product. Agricultural products are also meant for human consumption, so toxic chemicals cannot safely be applied to such products.

Antiviral compositions also are needed. Compositions that can effectively kill viruses are also needed. Viruses, such as influenza, are endemic to the human population and causes illness and death worldwide every year. Additionally, new virus outbreaks present an ongoing threat to human and animal health, such as the novel COVID-19 virus, SARS, and MERS.

Accordingly, compositions that are effective against a variety of microbes are still needed.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an antimicrobial composition comprising a water solution, where the water solution comprises a chlorite salt and/or chlorine dioxide having a concentration ranging from about 2,000 parts per million to about 8,000 parts per million, and one or more (quaternary ammonium compounds (also referred to herein as "quits") having a concentration ranging from about 5,000 parts per million to about 10,000 parts per million. In some embodiments, the composition can further comprise sodium tetraborate decahydrate (Borax) having a concentration of at least 8,000 parts per million, for example, about 8000 parts per million to about 15,000 parts per million. In some embodiments, the formula can include a surfactant having a concentration of at least about 1,000 parts per million. While not being bound by theory, the chlorite salt and/or chlorine dioxide can be considered stabilized chlorine dioxide, which can effectively kill harmful bacteria on an object to which the antimicrobial composition is applied. The quat can also provide antimicrobial properties to help kill harmful bacteria or viruses. The Borax can also act a buffer for the antimicrobial composition and can also provide anti-fungal properties to the composition. The surfactant can decrease the surface tension of the anti-microbial composition to make it easier to apply to an object.

In one embodiment, an antimicrobial composition comprises a water solution comprising a chlorite salt and/or chlorine dioxide having a concentration ranging from about 2,000 parts per million to about 8,000 parts per million, and at least one quaternary ammonium compound having a concentration ranging from about 5,000 parts per million to about 10,000 parts per million.

In some embodiments, the concentration of the chlorite salt and/or chlorine dioxide to the water solution ranges from about 5,000 parts per million to about 8,000 parts per million, and the at least one quaternary ammonium salt has a concentration ranging from about 6,000 parts per million to about 10,000 parts per million.

In some embodiments, the quaternary ammonium salt comprises an n-alkyl dimethyl benzyl ammonium chloride, an n-alkyl dimethyl ethylbenzyl ammonium chloride, didecyldimethylammonium chloride, cetalkonium chloride, cetylpyridinium chloride, cetrimonium, tetraethylammonium bromide, domiphen bromide, benzethonium chloride, or any combination thereof.

In some embodiments, the quaternary ammonium salt comprises an n-alkyl dimethyl benzyl ammonium chloride and an n-alkyl dimethyl ethyl benzyl ammonium chloride. In some embodiments, the alkyl group on the n-alkyl dimethyl benzyl ammonium chloride comprises $C_{12}$, $C_{14}$, $C_{16}$ and $C_{18}$ carbon groups. In some embodiments, the alkyl group on the n-alkyl dimethyl ethylbenzyl ammonium chloride comprises $C_{12}$ and $C_{14}$ carbon groups. In some embodiments, the n-alkyl dimethyl benzyl ammonium chloride comprises about 5% $C_{12}$, about 60% $C_{14}$, about 30% $C_{16}$, and about 5% $C_{18}$ carbon groups, and the n-alkyl dimethyl ethylbenzyl ammonium chloride comprises about 68% $C_{12}$ and about 32% $C_{14}$ carbon groups.

In some embodiments, the composition further comprises sodium tetraborate in a concentration ranging from about 8,000 parts per million to about 15,000 parts per million.

In some embodiments, the composition further comprises a buffer. In some embodiments, the buffer comprises sodium bicarbonate, ferric chloride, citric acid, sodium percarbonate, trisodium phosphate, acetic acid, sodium acetate, or any combination thereof.

In some embodiments, the buffer comprises the sodium acetate in a concentration ranging from about 500 to about 1500 parts per million. In some embodiments, the buffer further comprises acetic acid in a concentration ranging from about 100 to about 5000 parts per million, where the acetic acid has a dilution ratio of about 1:8 to about 1:12, In some embodiments, the composition further comprises a surfactant having a concentration ranging from about 100 parts per million to about 3,000 parts per million. In some embodiments, the surfactant comprises non-ionic surfactant.

In some embodiments, the surfactant comprises a an alkoxylated non-ionic surfactant, such as ethoxylated alcohol. In some embodiments, the ethoxylated alcohols are $C_9$-$C_{11}$ ethoxylated alcohols.

In some embodiments, the pH of the composition ranges from about 6.8 to about 7.2.

In some embodiments, the antimicrobial composition has a sporicidal efficacy of substantially 100 percent against endospores of *Clostridium difficile* ATCC 43598 in an ASTM E2315 compliant test after a contact time up to about 120 seconds In some embodiments, the antimicrobial composition has a sporicidal efficacy of substantially 100 percent against endospores of *Escherichia Coli* in an ASTM E2315 compliant test after a contact time of about 30 seconds.

In some embodiments, an antimicrobial comprises a water solution comprising: about 5,000 parts per million of a chlorite salt and/or chlorine dioxide about 7,000 parts per million of a quaternary ammonium compound, and about 100 parts per million of an ethoxylated alcohol surfactant. In one embodiment, the quaternary ammonium compound comprises an n-alkyl dimethyl benzyl ammonium chloride and an n-alkyl dimethyl ethyl benzyl ammonium chloride. The composition may further comprises about 10,000 parts per million of sodium tetraborate In another embodiment, the composition further comprises about 800 parts per million of sodium acetate and about 3200 parts per million of acetic acid, wherein the acetic acid has a 1:10 dilution. In yet another embodiments, the composition further comprises sodium acetate, ferric chloride, citric acid, sodium percarbonate, trisodium phosphate, or any combination thereof in a concentration ranging from about 500 to about 1000 parts per million.

The anti-microbial composition can be used as a cleaning compound for killing undesirable bacteria on a desired surface or product, and can be sold in liquid or aerosol form in different embodiments. Thus, the present disclosure further provides methods for disinfecting an object comprising applying any of the afore described compositions to the object. The object may be a hard surface or a soft surface. In some embodiments, the object is contaminated with a bacteria or a virus, and the method kills at least 99% of the virus or bacteria on the object.

In another embodiment, the present disclosure provides a method for disinfecting air comprising electrostatically spraying any of the aforementioned compositions.

Another aspect of the present disclosure is applying an antimicrobial composition to an agricultural product, including but limited to plants, vegetables, fruits, herbs, grains, legumes, *cannabis*, hemp, etc. The antimicrobial composition can effectively eliminate the bacteria on the agricultural product while substantially preserving the agricultural product itself.

Another aspect of the present disclosure is applying an antimicrobial composition to a water supply to kill bacteria within the water supply such a method can be used in medical situations to clean treatment water, for instance in dialysis machines. The anti-microbial composition can effectively kill bacteria within the water but still be safe and consumable by a patient.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 1 depicts a table summarizing the kill results of an exemplary composition against *P. aeruginosa*.

FIG. 2 depicts a table summarizing the results of a study of an exemplary composition against *E. coli* and *S. aureus*.

FIG. 3 depicts a table summarizing the results of a study of an exemplary composition against *E. aerogenes* and *S. aureus*.

DETAILED DESCRIPTION

Figure 4:
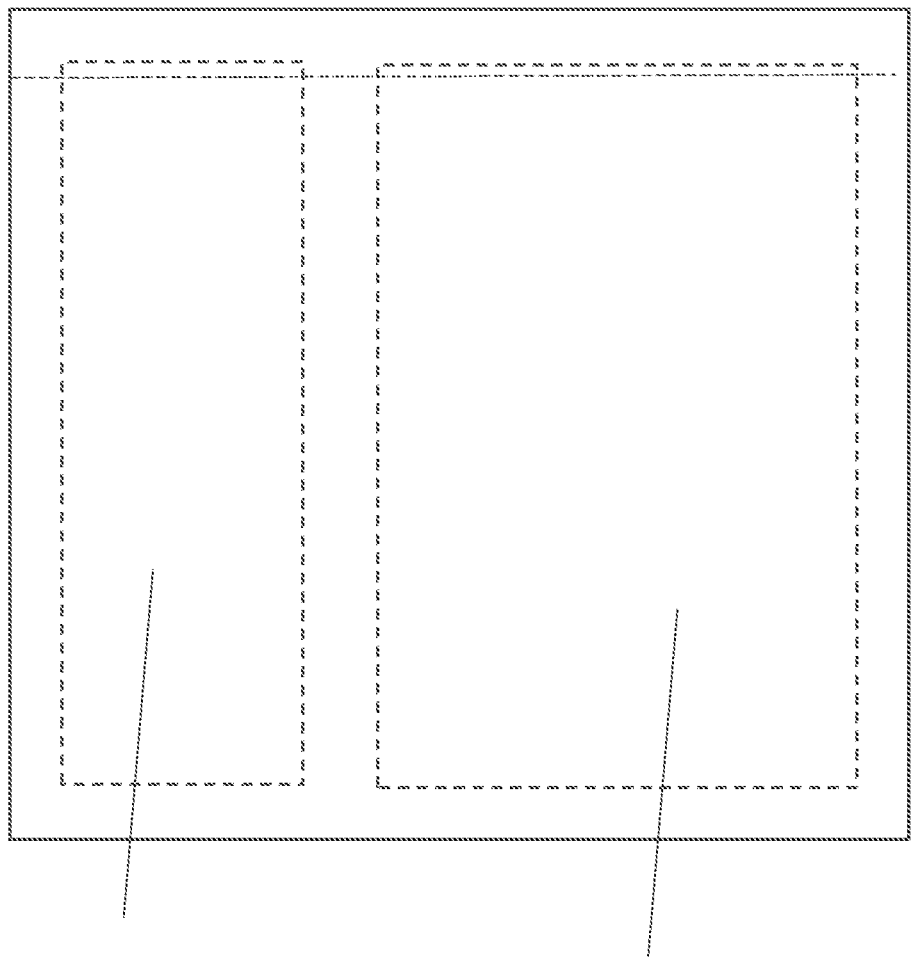
FIG. 4 is a schematic depicting an exemplary packing for dry ingredients for the present antimicrobial compositions.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The qualifier "about" as used herein regarding contact time can describe a tolerance of up to five seconds around the stated contact time. The qualifier "about," when used regarding chlorine dioxide concentration describes a tolerance of up to five percent around the stated concentration.

The qualifier "substantially," when used regarding percent of sporicidal efficacy, describes at least 99.99% of bacteria present in a sample being killed or eliminated, or any deviation from a 100 percent kill efficacy having no infectious impact and remaining within any associated applicable regulatory compliance.

The concentrations described herein are concentrations of a particular component with respect to the complete antimicrobial composition, not only the water component of the composition.

One aspect of the present disclosure is an antimicrobial composition including a chlorite salt and/or chlorine dioxide dissolved in water. The present compositions include a chlorite salt, such as sodium chlorite, as an ingredient. Those skilled in the art will readily appreciate that some of the sodium chlorite will, upon dissolution in water, form chlorine dioxide. Thus, the term "chlorite salt and/or chlorine dioxide" encompasses solutions that comprise chlorite (such as sodium chlorite), chlorine dioxide, and mixtures thereof.

In some embodiments, the anti-microbial composition can have a demonstrable sporicidal efficacy of substantially 100 percent against endospores of *Clostridium difficile* ATCC 43598 in an ASTM E2315 compliant test after a contact time up to about 120 seconds, or after about 120 seconds.

In some embodiments, the concentration of chlorine dioxide to water solution can be between about 1,000 parts-per-million and about 10,000 parts per million. In some embodiments, the concentration of chlorine dioxide to water solution can be between about 3,000 parts-per-million and about 7,000 parts per million. In some embodiments, the concentration of chlorine dioxide to water solution can be between about 4,000 parts-per-million and about 6,000 parts per million. In some embodiments, the concentration of chlorine dioxide to water solution can be about 1,000 parts-per-million, 2,000 parts-per-million, 3,000 parts-per-million, 4,000 parts-per-million, 5,000 parts-per-million, 6,000 parts-per-million, 7,000 parts-per-million, 8,000 parts-per-million, 9,000 parts-per-million, or 10,000 parts-per-million.

In some embodiments, the antimicrobial composition can include sodium chlorite and/or chlorine dioxide. In some embodiments, the concentration of the sodium chlorite and/or chlorine dioxide in the water solution can range between about 1,000 parts per million and about 10,000 parts per million. In some embodiments, the concentration of the sodium chlorite and/or chlorine dioxide in the water solution can range between about 3,000 parts per million and about 7,000 parts per million. In some embodiments, the concentration of the sodium chlorite and/or chlorine dioxide in the water solution can range between about 4,000 parts per million and about 6,000 parts per million. In some embodiments, the concentration of the sodium chlorite and/or chlorine dioxide in the water solution can be about 1,000 parts-per-million, 2,000 parts-per-million, 3,000 parts-per-million, 4,000 parts per million, 5,000 parts per million, 6,000 parts per million, 7,000 parts per million, 8,000 parts per million, 9,000 parts per million, or 10,000 parts per million.

The sodium chlorite and/or chlorine dioxide in the antimicrobial composition can provide anti-microbial or anti-bacterial properties to effectively kill unwanted bacteria in contact with the anti-microbial composition, such as *Clostridium difficile* ATCC 43598, *Staphylococcus aureus, Escherichia coli* (E-coli), *Pseudomonas Aeruginosa*, etc.

In some embodiments, the contact time to produce a sporicidal efficacy of substantially 100 percent against endospores of *Clostridium difficile* ATCC 43598 in an ASTM E2315 compliant test can range from about 60 seconds to about 120 seconds. In some embodiments, the contact time can range from about 30 seconds to about 120 seconds. In some embodiments, the contact time to produce a sporicidal efficacy of substantially 100 percent against endospores of *Clostridium difficile* ATCC 43598 in an ASTM E2315 compliant test can be about 15 seconds. In some embodiments, the antimicrobial composition can have a demonstrable sporicidal efficacy of substantially 100 percent against endospores of other bacteria such as *Staphylococcus aureus, Escherichia coli, Pseudomonas Aeruginosa*, etc. in an ASTM E2315 compliant test after a contact time of about 15-120 seconds.

In some embodiments, the antimicrobial composition can include sodium chlorite and/or chlorine dioxide and a quaternary ammonium compound solution. In some embodiments the antimicrobial composition can have a demonstrable sporicidal efficacy of substantially 100 percent against endospores of *Clostridium difficile* ATCC 43598 in an ASTM E2315 compliant test after the contact times mentioned herein. The one or more quats may provide additional antimicrobial or anti-bacterial properties, which can help kill unwanted or harmful bacteria.

In some embodiments, the total concentration of the one or more Quats to the water solution can range between about 4,000 parts per million and about 12,000 parts per million. In some embodiments, the total concentration of the one or more quats to the water solution can range between about 6,000 parts per million and about 10,000 parts per million. In some embodiments, the total concentration of the one or more quats to the water solution can range between about 6,000 parts per million and about 9,000 parts per million. In some embodiments, the total concentration of the one or more quats to the water solution can be about 4,000 parts per million, 5,000 parts per million, 6,000 parts per million, 7,000 parts per million, 8,000 parts per million, 9,000 parts per million, or 10,000 parts per million, 11,000 parts per million, or 12,000 parts per million. In some embodiments a single Quat can be used, while in other embodiments multiple quats can be used in combination with one another.

Quats can provide biocidal properties against bacteria by disrupting cell walls of the bacteria. Various types of Quats can be used, including but not limited to the quaternary ammonium salt comprises an n-alkyl dimethyl benzyl ammonium chloride, an n-alkyl dimethyl ethylbenzyl ammonium chloride, didecyldimethylammonium chloride, cetalkonium chloride, cetylpyridinium chloride, cetrimonium, tetraethylammonium bromide, domiphen bromide, benzethonium chloride, or any combination thereof.

In some embodiments, in some embodiments, the quaternary ammonium salt comprises an n-alkyl dimethylbenzylammonnium chloride and an n-alkyl dimethylethylbenzyl ammonium chloride. The n-alkyl group of the n-alkyl dimethylbenzylammonnium chlorides may comprise n-alkyl groups chosen from $C_{12}$, $C_{14}$, $C_{16}$, $C_{18}$, and any combination thereof. The n-alkyl group of the n-alkyl dimethylethylbenzylammonnium chlorides may comprise n-alkyl groups chosen from $C_{12}$, $C_{14}$, and combinations thereof. The antimicrobial composition of claim 4, wherein the n-alkyl dimethyl benzyl ammonium chloride comprises about 5% $C_{12}$, about 60% $C_{14}$, about 30% $C_{16}$, and about 5% $C_{18}$ carbon groups, and the n-alkyl dimethyl ethylbenzyl ammonium chloride comprises about 68% $C_{12}$ and about 32% $C_{14}$ carbon groups.

In some embodiments, the quaternary ammonium compounds are BTC® 2125M, available from Stephan Antimicrobials.

In some embodiments, the anti-microbial composition can further include sodium tetraborate decahydrate (Borax). Borax can act as a buffer to help balance the pH of the antimicrobial composition. Borax may also provide anti-fungal characteristics to help kill and prevent fungi from growing on a surface to be cleaned. In some embodiments, the concentration of the Borax in the water solution can range from about 5,000 parts per million and about 15,000 parts per million, or about 8,000 parts per million to about 15,000 parts per million. In some embodiments, the concentration of sodium tetraborate in the composition ranges from about 7,000 parts per million to about 13,000 parts per million. In some embodiments, the concentration of sodium tetraborate in the composition ranges from about 9,000 parts per million to about 11,000 parts per million. In some embodiments, the concentration of sodium tetraborate in the composition is about 5,000 parts-per-million, about 6,000 parts per million, about 7,000 parts per million, about 8,000 parts per million, about 9,000 parts per million, about 10,000 parts per million, about 11,000 parts-per-million, about 12,000 parts-per-million, about 13,000 parts per million, about 14,000 parts-per-million, or about 15,000 parts per million.

In further embodiments, the antimicrobial composition further comprises a buffer chosen from sodium bicarbonate, ferric chloride, citric acid, sodium percarbonate, trisodium phosphate, acetic acid, sodium acetate, and any combination thereof. The buffer may be in addition to the sodium tetraborate, or the composition may comprise one of these buffers, and not include sodium tetraborate.

In some embodiments, the composition does not comprise sodium tetraborate, and further comprises a buffer chosen from sodium bicarbonate, ferric chloride, citric acid, sodium percarbonate, trisodium phosphate, and any combination thereof.

In some embodiments, the antimicrobial composition can include sodium acetate and acetic acid as a buffer. The acetic acid may have a dilution ratio 1:5 and 1:15. In some embodiments, the concentration of the sodium acetate in the water solution can range from about 500 parts per million to about 1500 parts per million. In some embodiments, the concentration of the sodium acetate to the water solution can range from about 600 parts per million to about 1100 parts per million. In some embodiments, the concentration of the sodium acetate in the water solution can range from about 700 parts per million to about 900 parts per million. In some embodiments, the concentration of the sodium acetate in the water solution can be about 500 parts-per-million, about 600 parts per million, about 700 parts per million, about 800 parts per million, about 900 parts per million, or about 1000 parts per million, about 1100 parts-per-million, about 1200 parts-per-million, about 1300 parts-per-million, about 1400 parts-per-million, or about 1500 parts per million.

In some embodiments, the dilution ratio of the acetic acid can range between about 1:8 and 1:12. In some embodiments, the dilution of acetic acid can be about 1:5, 1:6, 1:7, 1:8, 1:9, 1:10, 1:11, 1:12, 1:13, 1:14, or 1:15.

In some embodiments, the antimicrobial composition can include a chlorite salt and/or chlorine dioxide non-reactive surfactant. In some embodiments, the chlorine dioxide and/or sodium chlorite nonreactive surfactant is a non-amine surfactant. In other embodiments, the chlorine dioxide and/or sodium chlorite or salts of chlorine dioxide nonreactive surfactant can be a non-octyldimethylamine oxide surfactant. In other embodiments the chlorine dioxide and/or sodium chlorite or salts of chlorine dioxide nonreactive surfactant is a non-lauryldimethylamine oxide surfactant. In still other embodiments the surfactant can be any suitable surfactant which can help decrease the surface tension of the antimicrobial composition to allow for easier dispersion of the antimicrobial compound on a surface or product of interest, In some embodiments, the surfactant can be an alkoxylated non-ionic surfactant, such as ethoxylated alcohols. In some embodiments, the ethoxylated alcohols comprise $C_6$-$C_{20}$ ethoxylated alcohols, while in other embodiments, the ethoxylated alcohols comprise $C_9$-$C_{11}$ ethoxylated alcohols, including those surfactants sold under the brand name Tomadol®, such as Tomadol 900. In other embodiments, the surfactant can include nonyl phenol ethoxylates, nonyl phenol propoxylates, or linear alkoxylated $C_6$-$C_{20}$ alcohols (4 mol-15 mol EO or PO).

In some embodiments, the concentration of the surfactant in the water solution can range from about 100 parts per million to about 3000 parts per million. In some embodiments, the concentration of the surfactant in the water solution can range from about 500 parts per million and about 2000 parts per million. In some embodiments, the concentration of the surfactant in the water solution can range from about 700 parts per million to about 1300 parts per million. In some embodiments, the concentration of the surfactant in the water solution can be about 300 parts-per-million, about 400 parts per million, about 500 parts per million, about 600 parts per million, about 700 parts-per-million, about 800 parts per million, about 900 parts per million, about 1000 parts per million, about 1100 parts per million, about 1100 parts per million, about 1200 parts-per-million, about 1300 parts-per-million, about 1400 parts per million, about 1500 parts-per-million, about 1600 parts per million, about 1700 parts per million, about 1800 parts per million, about 1900 parts-per-million, or about 2000 parts per million.

In some embodiments, the antimicrobial composition can include certain components having the following weight percentages: 98.4%-99.0% water, 0.45%-0.55% sodium chlorite and/or chlorine dioxide, and 0.63%-0.77% quats. In some embodiments, the antimicrobial composition can further include additional components having the following weight percentages: 0.009%-0.011% acetic acid, 0.09%-0.11% surfactant, and 0.072%-0.088% sodium acetate. In some embodiments, the sodium tetraborate can be substituted by any one of the following components in the amount of 0.072%-0.088% by weight: baking soda (sodium bicarbonate, $NaHCO_3$), iron chloride ($FeCl_3$), citric acid ($C_6H_8O_7$), sodium percarbonate ($Na_2H_3CO_6$), trisodium phosphate ($Na_3PO_4$).

In some embodiments, the antimicrobial composition of the present disclosure can be sold in a powder form that can be subsequently added to an appropriate amount of water. In some embodiments, the powder antimicrobial composition can have the certain components in the following dry weight percentages: 30.0%-47.0% sodium chlorite, and 45.0%-63.0% quats. In some embodiments, the powder antimicrobial composition can have the certain components in the following weight percentages: 30.0%-40.0% sodium chlorite, 45.0%-55.0% quats, 0.5%-0.9% acetic acid, 5.0%-9.0% surfactant, and 4.0%-7.0% sodium acetate (or the other substitutes identified above.

Figure 5:
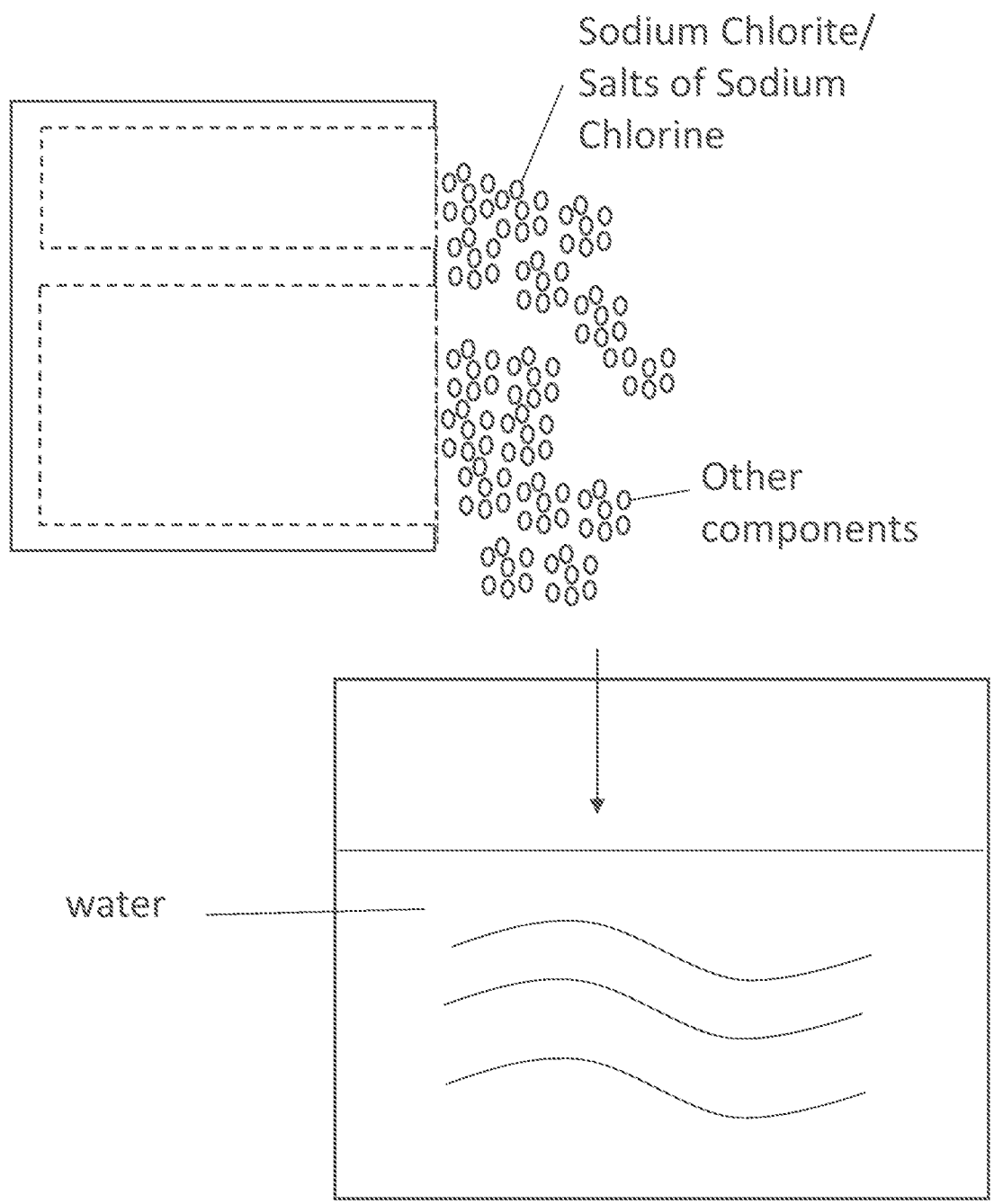
FIG. 5 is a schematic depicting the process for mixing the dry packaged ingredients.

In some embodiments, as shown in FIGS. 4-5, the powder can be packaged into multiple compartment containers with some components of the powder separated from others until the powder is added to water. For instance, in some embodiments, the sodium chlorite or salts of chlorine dioxide can be kept separate from the other components of the powder within the packaging for the powder. The packaging can be torn and the contents poured into an appropriate amount of water to form the desired antimicrobial solution. Having separate compartments for one or more components of the powder antimicrobial composition can help prevent unwanted chemical reactions between the powder chemical components prior to mixing the powder antimicrobial composition with water, thereby prolonging shelf life and advantageously providing a more portable product. An appropriate amount of water in some embodiments can be defined as an amount of water that when combined with the power antimicrobial composition produces a solution 98.4%-98.8% water by weight and 1.2-1.6% powder components by weight.

In another embodiment, the antimicrobial composition can be formulated as a hand care product, such as a disinfecting gel, spray, wipe, or lotion. In one embodiment, the composition comprises sodium chlorite in an amount ranging from about 0.4-0.5% by weight, quates (such as Stepan BTC® 2125 (80%)) in an amount ranging from about 0.6 to about 0.7% by weight, a surfactant (such as Tomadol®

900) in an amount ranging from about 0.05% to about 0.1% by weight, sodium tetraborate in an amount ranging from about 0.5% to about 1.0% by weight, an emollient compound in an amount ranging from about 0.1 to about 0.5% by weight, and up to about 97.5% by weight of deionized water. The emollient compound may be, in one embodiment, glycerin. In other embodiments, the emollient comprise glycerin shea butter, cocoa butter, lanolin, or any combination thereof. In some embodiments, the sodium tetraborate may be substituted by any one of the following components in the amount of 0.072%-0.088% by weight: baking soda (sodium bicarbonate, $NaHCO_3$), iron chloride ($FeCl_3$), citric acid ($C_6H_8O_7$), sodium percarbonate ($Na_2H_3CO_6$), trisodium phosphate ($Na_3PO_4$). The hand care formulation may be advantageously packaged for various uses, such as in dispensers for health care setting, public restroom settings, personal dispensing bottles for travel, etc.

The antimicrobial composition can be used in many different types of applications or administration protocols. For instance, in some embodiments, the antimicrobial composition is a hard surface disinfectant, and can come in a liquid form, which can be poured or sprayed from a conventional spray bottle onto a desired surface to be cleaned. In other embodiments, the antimicrobial composition can come in aerosol form and be an air disinfectant. In some embodiments, the antimicrobial composition can be an electrostatically sprayable air disinfectant. The anti-microbial composition can be used to clean surfaces in a variety of environments, including but not limited to medical, industrial, and residential environments (kitchens, bathrooms, etc.), hospitals, medical facilities, medical clinics, schools or other public buildings, industrial packaging plants, factories, manufacturing facilities, food processing and packaging facilities, restaurants, bars, etc. The antimicrobial composition can also be utilized as a wound cleaner or an antiseptic for cleaning out cuts, abrasions, or other wounds as well as to sterilize an injection or surgical site in a healthcare setting. The antimicrobial composition can also be used for industrial cleaning services, such as for mold and mildew removal services.

The above-described compositions may be used in the concentrations described above, or, if desired and depending on the application, the composition may be further diluted. For example, the composition may be diluted by an end user with additional water in an amount ranging from about 1:1 to about 1:40, about 1:1 to about 1:20, about 1:2 to about 1:20, about 1:2 to about 1:15, about 1:5 to about 1:20, about 1:5 to about 1:15, about 1:10, about 1:25, about 1:20, or about 1:40. Alternatively, the antimicrobial composition may be diluted and sold in ready-to-use forms for particular indications.

Another aspect of the present invention is a method of treating an agricultural product comprising the steps of: providing an antimicrobial composition, including any of the above described compositions, and applying the anti-microbial composition on the agricultural product. The anti-microbial can effectively kill undesirable bacteria from the agricultural product while leaving the agricultural product substantially intact. In some embodiments, the antimicrobial composition is diluted prior to treatment at a dilution ratio of about 1:10 to about 1:40. In some embodiments, the agricultural product can be plants of various varieties, vegetables, fruits, legumes, grains, cannabis, hemp etc. The antimicrobial composition of the present disclosure can advantageously kill unwanted bacteria and/or fungi while preserving the integrity of the underlying agricultural product. Testing of one embodiment of the antimicrobial composition on cannabis plants showed that the antimicrobial composition provided the sporicidal efficacies discussed herein while no significant damage or negative effect was observed in the cannabis plants to which the compound was applied. In still other embodiments, the anti-microbial composition can be applied to the meat and poultry industry to clean meat and poultry products prior to packaging.

Another aspect of the present invention is a method of treating a food source, such as that to be fed to animals or livestock, comprising the steps of: providing any of the above-described antimicrobial compositions and applying the anti-microbial composition on the food source. Applying the antimicrobial composition to a food source such as animal feed products can help kill any unwanted bacteria in the food source prior to the food source being fed to the animal or livestock. Having the food source treated with the antimicrobial composition of the present disclosure has also been shown to kill harmful bacteria inside the belly or digestive track of the target animal once the food source is ingested, including in chickens and pigs. Such a treatment protocol can help keep the animals or livestock healthy and help prevent unwanted bacteria to be passed on to humans who may consume any such animals or livestock.

Another aspect of the present disclosure is a method of treating a water supply including the steps of: providing an antimicrobial composition as described above; and introducing the anti-microbial composition into the water supply. In some embodiments, the antimicrobial composition can meet the EPA standards for a Category IV product or be non-toxic and non-irritant from a regulatory standpoint. As such, the anti-microbial can be consumed safely by humans and animals such that the antimicrobial composition can be used to treat drinking water supplies or other water supplies which can interact with humans and animals. In a medical setting, the antimicrobial composition can be used to treat water supplies which can be provided to varying medical devices, e.g. a medical dialysis unit.

The antimicrobial composition of the present disclosure can thus provide antimicrobial properties which can help kill unwanted bacteria from a surface or product. In some embodiments and application, the antimicrobial composition can also help provide antibacterial, antifungal, sanitization, disinfectant, odor elimination, or other beneficial cleaning characteristics. The anti-microbial composition can also generally be safe for contact with humans and animals, such that the product can be used to treat agricultural products and or water supplies which may be safely consumed or utilized by the public.

EXEMPLARY EMBODIMENTS

1. An antimicrobial composition comprising: a water solution comprising a chlorite salt and/or chlorine dioxide having a concentration ranging from about 2,000 parts per million to about 8,000 parts per million, and at least one quaternary ammonium salt having a concentration ranging from about 5,000 parts per million to about 10,000 parts per million.
2. The antimicrobial composition of embodiment 1, wherein: the concentration of the chlorite salt and/or chlorine dioxide to the water solution ranges from about 5,000 parts per million to about 8,000 parts per million, and the at least one quaternary ammonium salt has a concentration ranging from about 6,000 parts per million to about 10,000 parts per million.
3. The antimicrobial composition of embodiment 1 or 2, wherein the quaternary ammonium salt comprises an n-alkyl dimethyl benzyl ammonium chloride, an n-alkyl dimethyl ethylbenzyl ammonium chloride, didecyldimethylammonium chloride, cetalkonium chloride, cetylpyridinium chloride, cetrimonium, tetraethylammonium bromide, domiphen bromide, benzethonium chloride, or any combination thereof.

4. The antimicrobial composition of embodiment 3, wherein the quaternary ammonium salt comprises an n-alkyl dimethyl benzyl ammonium chloride and an n-alkyl dimethyl ethyl benzyl ammonium chloride.

5. The antimicrobial composition of embodiment 4, wherein the alkyl group on the n-alkyl dimethyl benzyl ammonium chloride comprises $C_{12}$, $C_{14}$, $C_{16}$ and $C_{18}$ carbon groups.

6. The antimicrobial composition of embodiment 4, wherein the alkyl group on the n-alkyl dimethyl ethylbenzyl ammonium chloride comprises $C_{12}$ and $C_{14}$ carbon groups.

7. The antimicrobial composition of embodiment 4, wherein the n-alkyl dimethyl benzyl ammonium chloride comprises about 5% $C_{12}$, about 60% $C_{14}$, about 30% $C_{16}$, and about 5% $C_{18}$ carbon groups, and the n-alkyl dimethyl ethylbenzyl ammonium chloride comprises about 68% $C_{12}$ and about 32% $C_{14}$ carbon groups 8. The antimicrobial composition of any one of embodiments 1 to 7, further comprising sodium tetraborate in a concentration ranging from about 8,000 parts per million to about 15,000 parts per million.

9. The antimicrobial composition of any one of embodiments 1 to 8, further comprising a buffer.

10. The antimicrobial composition of embodiment 9, wherein the buffer comprises sodium bicarbonate, ferric chloride, citric acid, sodium percarbonate, trisodium phosphate, acetic acid, sodium acetate, or any combination thereof.

11. The antimicrobial composition of embodiment 10, wherein the buffer comprises the sodium acetate in a concentration ranging from about 500 to about 1500 parts per million.

12. The antimicrobial composition of embodiment 10 or 11, wherein the buffer further comprises acetic acid in a concentration ranging from about 100 to about 5000 parts per million, where the acetic acid has a dilution ratio of about 1:8 to about 1:12.

13. The antimicrobial composition of any one of embodiments 1 to 12, 1, further comprising a surfactant having a concentration ranging from about 100 parts per million to about 3,000 parts per million.

14. The antimicrobial composition of embodiment 13, wherein the surfactant comprises a non-ionic surfactant.

15. The antimicrobial composition of embodiment 13, wherein the surfactant comprises an alkoxylated non-ionic surfactant.

16. The antimicrobial composition of embodiment 15, wherein the alkoxylated non-ionic surfactant comprises ethoxylated alcohols.

17. The antimicrobial composition of embodiment 16, wherein the ethoxylated alcohols are $C_9$-$C_{11}$ ethoxylated alcohols.

18. The antimicrobial composition of any one of embodiments 1 to 17, wherein the pH of the composition ranges from about 6.8 to about 7.2.

19. The antimicrobial composition of any one of embodiments 1 to 18, wherein the antimicrobial composition has a sporicidal efficacy of substantially 100 percent against endospores of *Clostridium difficile* ATCC 43598 in an ASTM E2315 compliant test after a contact time up to about 120 seconds.

20. The antimicrobial composition of any one of embodiments 1 to 19, wherein the antimicrobial composition has a sporicidal efficacy of substantially 100 percent against endospores of *Escherichia Coli* in an ASTM E2315 compliant test after a contact time of about 30 seconds.

21. An antimicrobial composition comprising water solution comprising:
  about 5,000 parts per million of a chlorite salt and/or chlorine dioxide
  about 7,000 parts per million of a quaternary ammonium compound, and
  about 100 parts per million of an ethoxylated alcohol surfactant.

22. The antimicrobial composition of embodiment 21, wherein the quaternary ammonium compound comprises an n-alkyl dimethyl benzyl ammonium chloride and an n-alkyl dimethyl ethyl benzyl ammonium chloride.

23. The antimicrobial composition of embodiment 21 or 22, further comprising about 10,000 parts per million of sodium tetraborate.

24. The antimicrobial composition of any one of embodiments 21 to 23, further comprising about 800 parts per million of sodium acetate and about 3200 parts per million of acetic acid, wherein the acetic acid has a 1:10 dilution.

25. The antimicrobial composition of any one of embodiments 21 to 24, wherein the composition further comprises sodium acetate, ferric chloride, citric acid, sodium percarbonate, trisodium phosphate, or any combination thereof in a concentration ranging from about 500 to about 1500 parts per million.

26. A method for disinfecting an object comprising applying the composition of claim 1 to the object.

27. The embodiment of claim 26, wherein the object is a hard surface or a soft surface.

28. The embodiment of claim 28, wherein the object is contaminated with a bacteria or a virus, and the method kills at least 99.5% of the virus or bacteria on the object.

29. The embodiment of claim 28, wherein the bacteria comprises *Clostridium difficile, Staphylococcus aureus, Escherichia coli, Pseudomonas Aeruginosa, Enterobacter aerogenes*, or any combination thereof.

30. The embodiment of claim 28, wherein the virus comprises COVID-19, SARS, MERS, influenza, or any combination thereof.

EXAMPLES

Example 1

Table 1 lists exemplary antimicrobial compositions in accordance with the present disclosure.

TABLE 1

Exemplary Formulations (ingredients are listed as weight percent, with ranges listed in parentheses).

| Ingredient | Formula 1 | Formula 2 | Formula 3 |
|---|---|---|---|
| Water | 97.7% | 97.30 | |
| Sodium chlorite | 0.5% (0.45-0.55) | 0.5% (0.45-0.55) | 0.5% (0.45-0.55) |
| Stepan BTC ® 2125-80% | 0.7% (0.63-0.77) | 0.7% (0.63-0.77) | 0.7% (0.63-0.77) |
| Tomadol ® 900 | 0.1% (0.09-0.11) | 0.1% (0.09-0.11) | 0.1% (0.09-0.11) |
| Sodium Tetraborate decahydrate | 1.0% (0.90-1.10) | 1.0% (0.90-1.10) | |
| Sodium acetate | | 0.08% (0.07-0.09) | 0.08% (0.07-0.09) |
| Glacial acetic acid (1:10 dilution) | | 0.32 (0.32-0.33) | 0.01% (0.009-0.011) |

FIG. 1 depicts a table summarizing results from kill tests of a composition of the present disclosure comprising 0.5% sodium chlorite and/or chlorine dioxide when tested against *P. aeruginosa*. Additional testing has confirmed that the Formula 1 can kill *E. coli*, *S. aureus*, and *Botrytis cinerea* at a sporicidal efficacy of 99.9999% after 15 seconds, and can kill *P. aeruginosa* at a sporicidal efficacy of 99.99% after 15 seconds.

Example 2: Germicidal and Detergent Sanitizing Action of Antimicrobial Compositions The purpose of this assay is to determine the efficacy of Formula 1 (RD286) to sanitize pre-cleaned, nonporous food contact surfaces using the AOAC Germicidal and Detergent Sanitizing Action of Disinfectants method. This method is in compliance with the requirements of the U.S. Environmental Protection Agency (EPA) and Health Canada.

Preparation of Test Substance: An equivalent dilution of 1:15, defined as 1 part test substance+15 parts diluent, was prepared using 14.0 ml of the test substance and 210.0 ml of 400 ppm AOAC Synthetic Hard Water. The prepared test substance was homogenous as determined by visual observation and was used within three hours of preparation. A 99 0.0 ml aliquot of test substance was transferred to a sterile 250-300 ml Erlenmeyer flask per test organism, per lot. Each flask was placed into a water bath at 25.0° C. and equilibrated for >10 minutes.

Preparation of Test Organisms: For *Staphylococcus aureus* (ATCC 6538) and *Escherichia coli* (ATCC 11229), a loopful of a thawed cryovial of stock organism broth culture was streaked to a Nutrient Agar A slant medium and was incubated at 35-37° C. (36.0° C.) for 24±2 hours (23 hours). For the final test culture, 5.0 ml of Phosphate Buffer Dilution Water (PBDW) was added to the Nutrient Agar A slant, following incubation. Using a sterile loop, the growth was dislodged from the agar surface. The mixture was collected, transferred to a vessel containing 99.0 ml of PBDW and mixed thoroughly. A total of 5 Nutrient Agar B plates were inoculated, per test organism, using 200 µl of culture, spreading the inoculum to create a lawn of growth. The plates were incubated at 35-37° C. (36 0.0° C.) for 24±2 hours (24 hours). Following incubation, 5.0 ml of Phosphate Buffered Saline+0.1% Tween 80 was added to each plate. Using a plate spreader, the culture was gently dislodged from the agar surface avoiding disrupting the agar. The culture was collected, combined, and then mixed thoroughly. The collected culture was filtered through sterile Whatman #2 filter paper using a vacuum source. To target approximately $1 \times 10^9$ to $1 \times 10^{10}$ CFU/ml (9-10 logs/ml}, a spectrophotometric analysis was performed using a wavelength of 620 nm. The final absorbance value was 1.443 for *Staphylococcus aureus* (ATCC 6538) and 1.441 for *Escherichia coli* (ATCC 11229).

Addition of Organic Soil Load: A 0.30 ml aliquot of FBS was added to 5.7 ml of each prepared culture to yield a 5% fetal bovine serum organic soil load.

Exposure Conditions: Each flask containing the test substance was whirled stopping just before the suspension was added, creating enough residual motion of liquid to prevent pooling of the suspension at the point of contact with test substance. A 1.00 ml aliquot of culture was added midway between the center and edge of the surface with the tip of the pipette slightly immersed in the test solution. Touching the neck or side of the flasks was avoided. Each flask was swirled to thoroughly mix the contents and was exposed for the 30 seconds exposure time at the exposure temperature 25±1 (25.0° C.).

Test System Recovery: Following exposure, 1.00 ml of the inoculated test substance was transferred to 9 ml of neutralizer. The neutralized material was vortex mixed. The neutralized contents corresponded to the 10–1 dilution. Four 1.00 ml and four 0.100 ml aliquots of the neutralized material were transferred to individual sterile Petri dishes spread-plated onto the subculture agar medium.

Incubation and observation: All subculture plates were incubated for 24-30 hours (24 hours) at 35-37° C. (36.0° C.). Following incubation, the subculture plates were visually examined for growth. Representative test and positive control subcultures showing growth were visually examined, Gram stained and biochemically assayed to confirm or rule out the presence of the test organism.

Purity Control: A "streak plate for isolation" was performed on each organism culture and following incubation examined in order to confirm the presence of a pure culture. The acceptance criterion for this study control is a pure culture demonstrating colony morphology typical of the test organism.

Organic Soil Sterility Control: Concurrent with testing, the serum used for the organic soil load was cultured, incubated, and visually examined for growth. The acceptance criterion for this study control is lack of growth.

Neutralizer Sterility Control: Concurrent with testing, the neutralizer used in testing was evaluated for sterility. A representative sample of neutralizer (1.00 ml) was plated onto the subculture medium as in the test. The plate was incubated and visually examined. The acceptance criterion for this study control is a lack of growth.

Test Substance Diluent Sterility Control: Concurrent with testing, the test substance diluent used in testing was evaluated for sterility. A representative sample of test substance diluent (1.00 ml) was plated onto the subculture agar medium as in the test. The plate was incubated and visually examined. The acceptance criterion for this study control is a lack of growth.

PBDW Sterility Control: Concurrent with testing, the PBDW used in testing was evaluated for sterility. A representative sample of PBDW (1.00 ml) was plated onto the subculture medium as in the test. The plate was incubated and visually examined. The acceptance criterion for this study control is a lack of growth.

Test Substance Sterility Control: A representative sample of prepared test substance (1 0.00 ml), per lot used in testing, was plated onto the subculture agar medium as in the test. Each plate was incubated and visually examined.

Numbers Control: A 99 0.0 ml aliquot of PBDW was transferred to a sterile 250-300 ml Erlenmeyer flask, per test organism. Each flask was equilibrated in a water bath at 25.0° C. for >10 minutes. Each flask was whirled and 1.00 ml of culture was added as in the test procedure. Each flask was swirled to thoroughly mix the contents. Within approximately 30 seconds, 1.00 ml of the contents was transferred to 9 ml of neutralizer. The neutralized contents correspond to the 10–1 dilution. Ten-fold serial dilutions were prepared to 10·6. Four 1.00 ml and four 0.100 ml aliquots of the 10–e dilution were plated onto the subculture agar medium as in the test. This resulted in the $10^{-6}$ and $10^{-7}$ dilutions, respectively. The plates were incubated. The acceptance criterion for this control is a minimum value of 7.0 $\log_{10}$.

Neutralization Confirmation Control: The following neutralization confirmation control was performed concurrent with testing. Each prepared test culture was diluted to target $1 \times 10^4$-$1 \times 10^5$ CFU/ml (to target a result of 10-100 CFU plated in each control run). Multiple organism dilutions were prepared.

Test Culture Titer (TCT): A 0.100 ml aliquot of diluted test organism was added to 10.0 ml of PBDW and was vortex mixed. The mixture was held for a minimum of 2 minutes and duplicate 0.100 ml aliquots were spread plated as in the test. The acceptance criterion for this study control is growth.

Neutralization Confirmation Control Treatment (NCT): A 1.00 ml aliquot of test substance, per lot, was added to 9 ml of neutralizer and was vortex mixed. Within approximately 30 seconds, 0.100 ml of diluted test organism was added to the neutralized contents and was vortex mixed. The mixture was held for a minimum of 2 minutes and duplicate 0.100 ml aliquots were spread plated as in the test. The acceptance criterion for this study control is growth within 1 $\log_{10}$ of the test culture titer (TCT).

Neutralizer Toxicity Treatment (NTT): A 0.100 ml aliquot of diluted test organism was added to 10.0 ml of neutralizer and was vortex mixed. The mixture was held for a minimum of 2 minutes and duplicate 0.100 ml aliquots were spread plated as in the test. The acceptance criterion for this study control is growth within 1 $\log_{10}$ of the test culture titer (TCT).

Lots 1, 2 and 3 of Formula 1, diluted 1:15, defined as 1 part test substance+15 parts 400 ppm AOAC Synthetic Hard Water, demonstrated a 99.9999% (6.04 $\log_{10}$), >99 0.99999% (>7.52 $\log_{10}$) and >99 0.99999% (>7.52 $\log_{10}$) reduction of *Escherichia coli* (ATCC 11229), respectively, following a 30 second exposure time at 25±1 (25.0° C.) in the presence of a 5% fetal bovine serum organic soil load.

All three lots also demonstrated a >99.99999% (>7.40 $\log_{10}$) reduction of *Staphylococcus aureus* (ATCC 6538) following a 30 second exposure time at 25±1 (25.0° C.) in the presence of a 5% fetal bovine serum organic soil load. The results are summarized in the table depicted in FIG. 2.

Example 3: Efficacy of Antimicrobial Composition on Non-Food Contact Surfaces

The purpose of this study was to determine the antimicrobial efficacy of spray application of a composition of Formula 1 on hard, inanimate, non-porous, non-food contact surfaces. The study was performed in compliance with the U.S. Environmental Protection Agency (EPA) requirements.

A solution of 1:15 defined as 1 part test substance (Formula 1) plus 15 parts of 400 ppm AOAC synthetic hard water was prepared. From a stock slant no more than 5 transfers from original stock and <1 month old, an initial tube (10 ml) of culture broth was inoculated. This culture was termed the "initial broth suspension." From this initial broth suspension, a minimum of three daily transfers using 1 loopful (10 µL) of culture into 10 ml of culture media was performed on consecutive days prior to use as an inoculum. The *Staphylococcus aureus* daily transfer was incubated at 35-37° C. (36.0° C.) and the *Enterobacter aerogenes* daily transfer was incubated at 25-32° C. (29.0° C.), for 24±2 hours using the appropriate growth medium.

A 48-54 hour (48 hour) culture was incubated at 35-37° C. (36.0° C.) for *Staphylococcus aureus* and at 25-32° C. (29.0° C.) for *Enterobacter aerogenes*. Each culture was vortex-mixed and allowed to settle for ~15 minutes. The upper ⅔rds of the culture was removed and transferred to a sterile vessel for use in testing. The *Enterobacter aerogenes* culture was diluted using sterile growth medium by combining 1.0 ml of test organism suspension with 4.0 ml of sterile growth medium. The cultures were thoroughly mixed prior to use.

A 0.10 ml aliquot of FBS was added to 1.90 ml of each prepared culture to yield a 5% fetal bovine serum organic soil load.

Sterile carriers were inoculated with 0.02 ml (20.0 µl) of culture using a calibrated pipettor spreading the inoculum to within approximately 3 mm of the edges of the carrier. The inoculated carriers were dried for 20 minutes at 35-37° C. (36.0-36.1° C.) and 40-41% relative humidity with the Petri dish lids slightly ajar and appeared visibly dry following drying. A constant humidity chamber was used in place of a desiccating chamber to ensure uniform humidification conditions and to overcome slow re-equilibration of a desiccator after opening.

Following the completion of drying, each of the five test carriers were sprayed with test substance using staggered intervals. Carriers were sprayed at a distance of 6-8 inches using 6 sprays, until thoroughly wet (6 sprays used) and were allowed to expose at room temperature (20.0° C.) and 47% relative humidity for 4 minutes. Following exposure, each carrier was transferred to 20 ml of neutralizer using identical staggered intervals. The jars were vortex-mixed for 10-15 seconds to suspend the surviving organisms.

Within 30 minutes of neutralization, duplicate 1.00 ml and 0.100 ml aliquots of the neutralized solution (10°) were plated onto the recovery agar plate medium.

The *S. aureus* plates were incubated at 35-37° C. (36 0.0° C.) for 48±4 hours (44.75 hours). The *E. aerogenes* plates were incubated at 25-32° C. (29.0° C.) for 48±4 hours (44.75 hours). Following incubation, the subcultures were visually enumerated.

Carrier Population Control: Three inoculated, dried control carriers were treated in a fashion similar to the test procedure by misting the carriers with sterile deionized water. Following exposure, the carriers were neutralized as in the test and mixed as in the test. Ten-fold serial dilutions were prepared and duplicate 0.100 ml aliquots of the 10–1 through 10–4 dilutions were plated onto an appropriate agar. The plates were incubated as in the test procedure and enumerated. The acceptance criterion for this control is a minimum geometric mean value of $7.5 \times 10^5$ CFU/carrier.

Carrier Sterility Control: Concurrent with testing, a representative, uninoculated carrier was added to the neutralizer. The vessel was mixed and 1.00 ml was plated onto appropriate agar and incubated. The acceptance criterion is a lack of growth following incubation.

Neutralizer Sterility: Concurrent with testing, a 1.00 ml aliquot of neutralizer was plated onto appropriate agar and incubated. The acceptance criterion is a lack of growth following incubation.

Culture Purity: A "streak plate for isolation" was performed on each organism culture and following incubation examined in order to confirm the presence of a pure culture. The acceptance criterion for this study control is a pure culture demonstrating colony morphology typical of the test organism.

Organic Soil Load Sterility: Concurrent with testing, the serum used for the organic soil load was cultured, incubated, and visually examined for lack of growth. The acceptance criterion for this study control is lack of growth.

Neutralization Confirmation Control: In a manner consistent with the AOAC 960 0.09 method, the neutralization confirmation control was performed concurrent with testing. The prepared test culture was serially diluted to target $2 \times 10^4 - 2 \times 10^5$ CFU/ml (to target a result of 10-100 CFU plated in each control run). Multiple organism dilutions were prepared.

Test Culture Titer (TCT): A 0.100 ml aliquot of diluted test organism was added to 20.0 ml of sterile diluent and vortex mixed. The mixture was held for a minimum of 30 minutes and was then spread plated utilizing duplicate 0.100 ml and 1.00 ml aliquots using the same method used in the test. The acceptance criterion for this study control is growth.

Neutralization Confirmation Control Treatment (NCT): A sterile carrier (one per test organism dilution to be used, per test substance to be evaluated) was sprayed with the test substance as in the test. The sterile carrier was allowed to expose for the exposure time and each carrier was neutralized with 20.0 ml of neutralizer. The jar was vortex-mixed for 10-15 seconds. Within 5 minutes, a 0.100 ml aliquot of diluted test organism was added to the neutralized contents and vortex mixed. The mixture was held for a minimum of 30 minutes and was then spread plated utilizing duplicate 0.100 ml and 1.00 ml aliquots using the same method used in the test. The acceptance criterion for this study control is growth within 1 $\log_{10}$ of the test culture titer (TCT) for at least one of the aliquots plated.

Neutralizer Toxicity Treatment (NTT): A 0.100 ml aliquot of diluted test organism was added to 20.0 ml of sterile neutralizer and was vortex mixed. The mixture was held for a minimum of 30 minutes and was then spread plated in duplicate 0.100 ml and 1.00 ml aliquots using the same method used in the test. The acceptance criterion for this study control is growth within 1 $\log_{10}$ of the test culture titer (TCT) for at least one of the aliquots plated.

Inoculum Count: Each test organism was serially diluted and 0.100 ml aliquots of appropriate dilutions were plated in duplicate. The plates were incubated as in the test. This control is for informational purposes and therefore has no acceptance criterion.

All three lots of Formula 1 as tested demonstrated a >99.999% reduction of *E. aerogenes* (ATCC 13048) following a 4 minute exposure time in the presence of a 5% fetal bovine serum organic soil load when tested at room temperature (20.0° C.). All three lots of Formula 1 as tested also demonstrated a >99.999% reduction of *S. aureus* (ATCC 6538) following a 4 minute exposure time in the presence of a 5% fetal bovine serum organic soil load when tested at room temperature (20.0° C.). These results are summarized in the Table depicted in FIG. 3.

Thus, although there have been described particular embodiments of the present invention of a new and useful ANTIMICROBIAL COMPOSITION, it is not intended that such references be construed as limitations upon the scope of this invention.

What is claimed is:

1. An antimicrobial composition comprising: a water solution comprising a chlorite salt having a concentration ranging from about 2,000 parts per million to about 8,000 parts per million, and at least one quaternary ammonium salt having a concentration ranging from about 5,000 parts per million to about 10,000 parts per million, no chlorine dioxide is present in solution.

2. The antimicrobial composition of claim 1, wherein: the concentration of the chlorite salt to the water solution ranges from about 5,000 parts per million to about 8,000 parts per million, and the at least one quaternary ammonium salt has a concentration ranging from about 6,000 parts per million to about 10,000 parts per million.

3. The antimicrobial composition of claim 1, wherein the quaternary ammonium salt comprises an n-alkyl dimethyl benzyl ammonium chloride, an n-alkyl dimethyl ethylbenzyl ammonium chloride, didecyldimethylammonium chloride, cetalkonium chloride, cetylpyridinium chloride, cetrimonium, tetraethylammonium bromide, domiphen bromide, benzethonium chloride, or any combination thereof.

4. The antimicrobial composition of claim 3, wherein the quaternary ammonium salt comprises an n-alkyl dimethyl benzyl ammonium chloride and an n-alkyl dimethyl ethyl benzyl ammonium chloride.

5. The antimicrobial composition of claim 4, wherein the alkyl group on the n-alkyl dimethyl benzyl ammonium chloride comprises C12, C14, C16 and C18 carbon groups.

6. The antimicrobial composition of claim 4, wherein the alkyl group on the n-alkyl dimethyl ethylbenzyl ammonium chloride comprises C12 and C14 carbon groups.

7. The antimicrobial composition of claim 4, wherein the n-alkyl dimethyl benzyl ammonium chloride comprises about 5% C12, about 60% C14, about 30% C16, and about 5% C18 carbon groups, and the n-alkyl dimethyl ethylbenzyl ammonium chloride comprises about 68% C12 and about 32% C14 carbon groups.

8. The antimicrobial composition of claim 1, further comprising sodium tetraborate in a concentration ranging from about 8,000 parts per million to about 15,000 parts per million.

9. The antimicrobial composition of claim 1, further comprising a buffer including sodium bicarbonate.

10. The antimicrobial composition of claim 9, wherein the buffer comprises the sodium bicarbonate in a concentration ranging from about 500 to about 1500 parts per million.

11. The antimicrobial composition of claim 1, further comprising a surfactant having a concentration ranging from about 100 parts per million to about 3,000 parts per million.

12. The antimicrobial composition of claim 11, wherein the surfactant comprises a non-ionic surfactant.

13. The antimicrobial composition of claim 11, wherein the surfactant comprises an alkoxylated non-ionic surfactant.

14. The antimicrobial composition of claim 13, wherein the alkoxylated non-ionic surfactant comprises ethoxylated alcohols.

15. The antimicrobial composition of claim 14, wherein the ethoxylated alcohols are C9-C11 ethoxylated alcohols.

16. The antimicrobial composition of claim 1, wherein the antimicrobial composition has a sporicidal efficacy of substantially 100 percent against endospores of *Clostridium difficile* ATCC 43598 in an ASTM E2315 compliant test after a contact time up to about 120 seconds.

17. An antimicrobial composition comprising water solution comprising:
a chlorite salt having a concentration ranging from about 2,000 parts per million to about 8,000 parts per million, and at least one quaternary ammonium salt having a concentration ranging from about 5,000 parts per million to about 10,000 parts per million, a buffer having a concentration of between about 100 parts per million and about 15,000 parts per million, wherein no chlorine dioxide is present in solution.

18. The antimicrobial composition of claim 17, wherein the quaternary ammonium compound comprises an n-alkyl dimethyl benzyl ammonium chloride and an n-alkyl dimethyl ethyl benzyl ammonium chloride.

19. The antimicrobial composition of claim 17, further comprising about 10,000 parts per million of sodium tetraborate.

20. A method for disinfecting an object comprising applying the composition of claim 1 to the object.

21. The method of claim 20, wherein the object is a hard surface or a soft surface.

22. The method of claim 20, wherein the object is contaminated with a bacteria or a virus, and the method kills at least 99.5% of the virus or bacteria on the object.

23. The method of claim 22, wherein the bacteria comprises *Clostridium difficile, Staphylococcus aureus, Escherichia coli, Pseudomonas Aeruginosa, Enterobacter aerogenes*, or any combination thereof.

24. The method of claim 22, wherein the virus comprises COVID-19, SARS, MERS, influenza, or any combination thereof.

* * * * *